Feb. 20, 1934.  J. B. TURNER  1,948,481
OIL EMULSION TREATING APPARATUS
Filed May 13, 1933
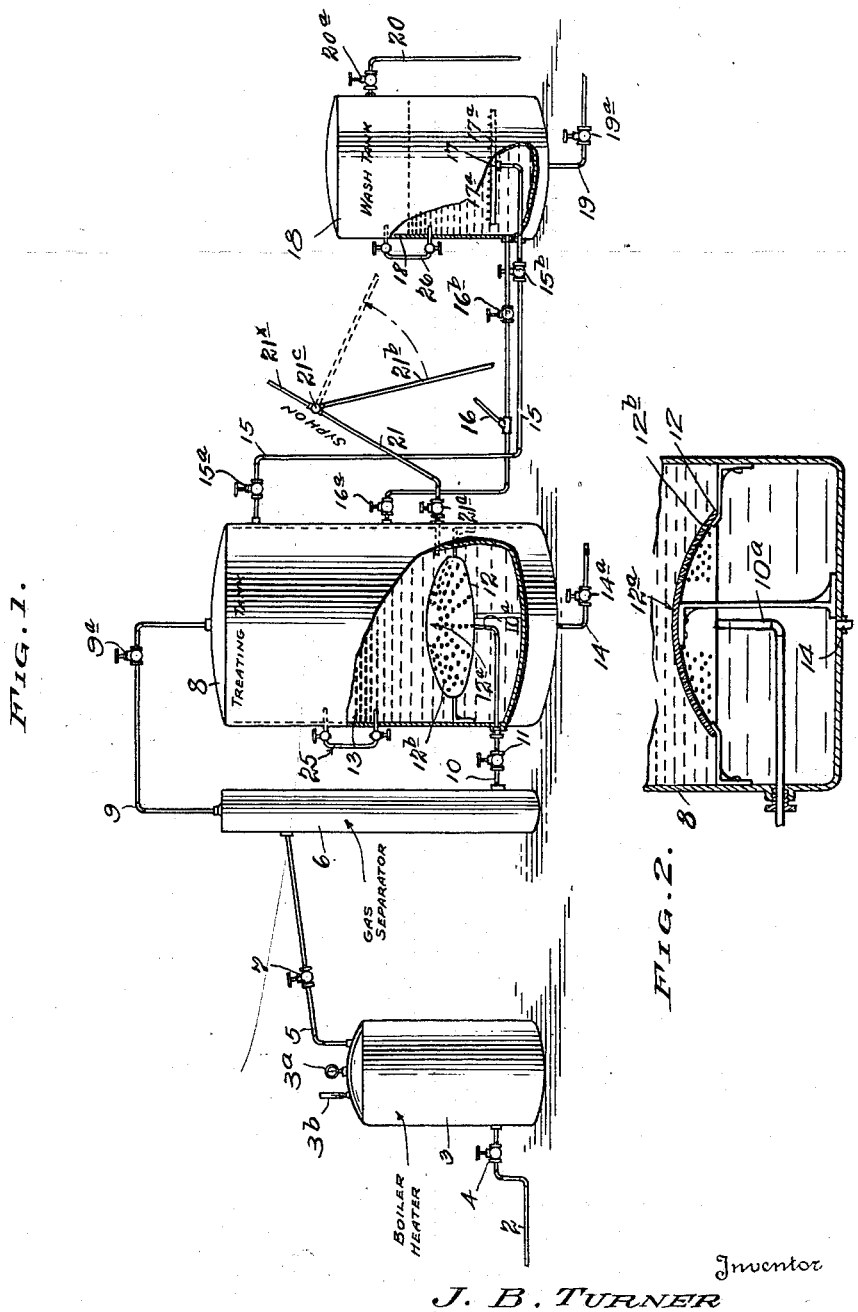

Patented Feb. 20, 1934

1,948,481

UNITED STATES PATENT OFFICE 1,948,481

OIL EMULSION TREATING APPARATUS

John B. Turner, Sasakwa, Okla.

Application May 13, 1933. Serial No. 670,968

9 Claims. (Cl. 196—5)

My invention relates to the dehydration of oil emulsions and has for its primary object to provide a greatly simplified and economical process and apparatus for this purpose.

The invention also contemplates the separation of the gas from the emulsion, or mixture of oil and foreign matter, in advance of subjection of the emulsion or mixture to a treatment calculated to break up oil globules and effect freeing of water and foreign matter therefrom, whereby to eliminate, during the treating stage referred to, the objectionable agitation that the gas would create is admixed with the emulsion.

Another phase of the invention contemplates the separation of the gas from the oil, emulsion or mixture preparatory to the purifying treatment to which the mixture is subjected and subsequently effecting a remixing of the gas with the purified oil so as to restore the treated oil to its proper specific gravity.

The invention also resides in certain novel features of apparatus construction including a combination baffle and spray element employed for breaking up the oil globules,—there being certain other novel steps in the treatment process as will be apparent hereinafter.

In one instance I accomplish the objects of my invention by the devices and means described in the following specification. My invention is clearly defined and pointed out in the appended claims. One embodiment of the invention is illustrated in the accompanying drawing forming a part of the specification and wherein,—

Figure 1 is a side elevational view, more or less diagrammatic in character, and showing certain parts in section; and, Figure 2 is a detail sectional view through the lower part of the treating tank and baffle incorporated therewith.

Referring to the drawing wherein the same reference characters have been used to designate the same parts throughout, numeral 2 indicates the supply line which leads from a well, storage tank or the like to the boiler 3. The boiler may be of any desired construction. Its function is to heat the incoming oil emulsion or mixture for the purpose of reducing its viscosity so as to facilitate the breaking of the oil globules as will be presently explained.

The boiler or heating means 3 will have a pressure gage 3a and will preferably have a thermostatic temperature control means of any desired character,—same having been indicated at 3b.

Leading from the top of the boiler 3 is the outlet pipe 5 which communicates with the upper end of the elongated upstanding casing or gas separating tank 6. There is a valve 7 in the pipe or line 5 so that the flow of oil from boiler 3 to gas separating tank 6 can be regulated.

The temperature to which the incoming oil mixture or emulsion will be heated in boiler 3 will depend upon the character of the oil. The greater the specific gravity of the oil the higher will be the temperature to which it will be heated in boiler 3.

The oil passes under pressure from the boiler 3 through the line 5 to the gas separating tank 6,—such gas as is mixed with the oil passing out through the pipe 9 extending from the top of the casing 6 and communicating with the top of the closed treating and washing tank 8. The flow of gas through the pipe 9 may be controlled by the valve 9a. There is also, as shown, a control valve 4 in the supply pipe 2 leading to the boiler 3.

Adjacent the bottom of the gas separator casing 6 there is the outlet pipe 10 for the hot gas-free oil. This pipe 10 leads into the treating and washing tank 8 and there is provided a control valve 11 in said pipe 10 as shown.

The inner end of the outflow pipe 10 for the oil from the gas separator casing 6 turns upwardly as indicated at 10a, preferably at approximately the center of the treating tank 8, and has its end spaced from and discharging against the central imperforate baffle portion 12a of the spray plate or partition 12, which is horizontally disposed in the treating tank 8 at a point well below the level 13 of water in the tank.

The hot oil discharged under pressure from the gas separator casing 6 discharges against the baffle portion 12a of plate 12 so as to break the oil globules and free water and foreign matter therefrom. The separated oil sprays or jets upwardly through the fine perforations 12b in plate 12 to float upon the water.

Adjacent the top of the treating tank 8 and below the oil level is the outlet pipe 15 controlled by the valve 15a.

The gas being discharged from the gas separator casing 6 into the top of the treating tank 8 eliminates absolutely, all agitation in the lower portion of the treating tank below and in the immediate vicinity of the combined spray and baffle member 12, thus permitting free and natural flow of the oil against baffling portion 12a of plate 12. This assures efficient breaking of the oil globules and the subsequent free and natural passage of the pure oil up through the apertures 12b of plate 12. However, the gas is properly remixed with the purified oil in the top of the treating tank 8 so as to give the oil its proper and natural specific gravity preparatory to passage out through the pipe 15 which communicates with the washing tank 18.

The purified oil outlet pipe 15 from treating tank 8 extends into the washing tank 18, there being an upwardly disposed terminal portion 17 for pipe 15 within tank 18. This terminal portion 17 carries the spray element having one or more arms 17a provided with spray or jet openings so that the incoming oil will pass upwardly through the water in tank 18 to accumulate in the top of the tank from whence it may be drawn out through line 20 to suitable storage tanks or the like. Line 20 is controlled by valve 20a as shown.

The treating tank 8 and the wash tank 18 have valve controlled drain outlets 14, 14a, and 19, 19a, respectively, so that the water can be drained when the tanks are to be cleaned.

I also preferably provide the siphon 21 which is adapted to automatically maintain the level of water in the treating tank 8,—there being illustrated the water pipe 16 for supplying water to the treating tank 8 and wash tank 18 from a suitable source. Valves 16a and 16b control the supply of water to the treating tank 8 and wash tank 18, respectively.

From the foregoing the operation of the device will be apparent. The gas separator casing 6 is in effect a pressure tank,—oil being forced thereinto from the boiler 3. From the gas separator or pressure tank 6 the operation is by gravity. No pumps are required which is a very great saving. By thermostatic control of the boiler 3 as indicated at 3b the operation of the device is entirely automatic and requires very little attention.

It is desirable that the water in the treating tank a and in the washing tank 18 be hot and the use of salt water in some cases is very desirable, and comes with oil from the well.

Unless the oil is cutting badly no chemical need be added in order to secure good results. Where cutting is noted a small quantity of chemical can be added at the well or tank or in the line 2.

It will be understood that the apparatus may be made in various sizes according to capacity desired. The form of the various parts can be modified considerably within the scope of the invention and some of them eliminated altogether.

Glass gauges 25, 26 are preferably used on the treating and washing tanks 8, 18,—respectively so that the operator will be able to note at a glance the water levels which will preferably be kept at about the mid-point of the gauges. Siphon 21 is used for this purpose,—the long arm 21b thereof being adjustable about swing joint 21c to vary the heighth of the outlet end of such arm.

It is also noted that the short arm of siphon 21 has the extension 21× which is open to the atmosphere and thus prevents the water in the tank from being completely drained.

In event that the fluid in treating tank 8 should be under pressure a gate or other valve such as 21a in the short arm of siphon 21; and same may be float-controlled if desired.

It is to be understood that in many instances sufficient water for tanks 8 and 18 will come in with the oil from the well,—but the water supply line 16 is available if needed.

Where the oil being treated is reasonably free of foreign matter, the wash tank 18 may not be needed and the oil can be piped to storage tanks direct from treating tank 8.

Brackets secured to the walls of the treating tank 8 may be used to support the baffle-strainer member 12 and/or a standard may support same from the bottom of tank 8. The edge of the baffle 12 will preferably be spaced several inches from the treating tank wall, but its inverted bowl-like form will cause oil to go up through apertures 12b rather than around its side edges.

Having thus described my invention what I claim as new and desire to secure by Letters Patent is—

1. An apparatus for dehydrating oil emulsions or mixtures comprising means for heating the liquid to a predetermined temperature, a gas separating tank receiving the heated mixture from said heating means, a gas outlet conduit in the top of said separating tank, a heated-oil outlet conduit in said separating tank, a treating and washing tank partially filled with aqueous liquid, said gas conduit from said separating tank discharging into the upper portion of said treating and washing tank, said oil outlet from said storage tank discharging upwardly into said treating and washing tank, a baffle in said treating tank arranged below the level of said aqueous liquid and opposite the discharge end of the said oil outlet pipe so that oil as discharged impinges directly thereagainst, and a perforated plate carried by said baffle and surrounding the same whereby purified oil may pass upwardly through the aqueous liquid in said treating and washing tank and mix with the gas in the upper portion of said tank, and an outlet for discharging the separated water and impurities from said treating and washing tank.

2. An apparatus for dehydrating oil emulsions or mixtures comprising means for heating the liquid to a predetermined temperature, a gas separating tank receiving the heated mixture from said heating means, a gas outlet conduit in the top of said separating tank, a heated-oil outlet conduit in said separating tank, a treating and washing tank partially filled with aqueous liquid, said gas conduit from said separating tank discharging into the upper portion of said treating and washing tank, said oil outlet from said separating tank discharging upwardly into said treating and washing tank, a baffle in said treating and washing tank arranged below the level of said aqueous liquid and opposite the discharge end of said oil outlet pipe so that oil as discharged impinges directly thereagainst, and a perforated plate carried by said baffle and surrounding the same whereby purified oil may pass upwardly through the aqueous liquid in said treating and washing tank and mix with the gas in the upper portion of said tank, a purified-oil washing tank, and a conduit connecting the upper purified oil containing portion of said treating and washing tank with said washing tank, and an outlet for discharging the separated water and impurities from said treating and washing tank.

3. An apparatus for dehydrating oil emulsions or mixtures comprising means for heating such liquid to a predetermined temperature, a gas separating tank receiving the heated mixture from said heating means, a gas outlet conduit in the top of said separating tank, a heated-oil outlet conduit in said separating tank, a treating and washing tank partially filled with aqueous liquid, said gas conduit from said separting tank discharging into the upper portion of said treating and washing tank, said oil outlet from said separating tank discharging upwardly into said treating tank, a baffle in said treating and washing tank arranged below the level of said aqueous liquid and opposite the discharge end of the said oil outlet pipe so that oil as discharged impinges directly thereagainst, a perforated plate carried by said baffle and surrounding the same whereby purified oil may pass upwardly through the aqueous liquid in said treating and washing tank and mix with the gas in the upper portion of said last named tank, and automatically operable siphon means for maintaining the aqueous liquid at a predetermined level in said treating tank.

4. An apparatus for dehydrating oil emulsions comprising, means for heating a liquid to a predetermined temperature, a gas separator for receiving such heated liquid from said heating means, a gas outlet conduit in the top of said separator, a heated oil outlet conduit in the lower part of said separator, a treating and washing tank partially filled with aqueous liquids, said gas conduit from said separator discharging into the upper part of said treating tank, said oil outlet from said separator discharging into the lower portion of said treating tank below the level of said aqueous liquid, means in said treating tank for finely dividing said oil whereby said oil will be purified by the removal of impurities in said oil and whereby the oil may pass upwardly in said treating tank to mix with gas in the upper portion of said treating tank, and means for discharging the separated water and the impurities from said treating tank.

5. The process of purifying a liquid containing oil emulsions and mixtures of oil and foreign matter which includes the step of heating said liquid to reduce its viscosity, then separating said liquid, into a gaseous and a liquid constituent, then impinging said liquid constituent against a baffle under water, then straining the impinged liquid to remove said foreign material therefrom, and then recombining the purified liquid constituent with said gaseous constituent.

6. The process of purifying a liquid containing oil emulsions and mixtures of oil and foreign matter which includes the step of heating said liquid to reduce its viscosity, then separating said liquid, into a gaseous and a liquid constituent, then impinging said liquid constituent against a baffle under water, then straining the impinged liquid to remove said foreign material therefrom, and then recombining said gaseous constituent and the purified liquid constituent to form oil, and finally washing the oil.

7. The process of purifying a liquid containing oil emulsions and mixtures of oil and foreign matter which includes the step of first removing excess gas from said liquid, then heating said liquid to reduce its viscosity, then further separating said liquid, into a gaseous and a liquid constituent, then impinging said liquid constituent against a baffle under water, then straining the impinged liquid to remove said foreign material therefrom, and then recombining the purified liquid constituent with said gaseous constituent.

8. In oil purifying apparatus for breaking oil and water emulsions, a downwardly facing concave baffle and strainer member, having a central imperforate portion and a perforated portion surrounding said imperforate portion, said baffle being adapted to be located in said apparatus so that when oil is projected in a jet it will impinge against said imperforate portion.

9. In oil purifying apparatus for breaking oil and water emulsions, a downwardly facing concave baffle and strainer member, having a central imperforate portion and a perforated portion surrounding said imperforate portion, said baffle being adapted to be located in said apparatus so that when oil is projected in a jet it will impinge against said imperforate portion, said two portions being integral whereby the impinged oil may immediately be strained through said perforated portion, and said baffle being adapted to operate under the level of a body of aqueous liquid in said apparatus.

JOHN B. TURNER.